US008983665B2

(12) United States Patent
Maass

(10) Patent No.: US 8,983,665 B2
(45) Date of Patent: Mar. 17, 2015

(54) DATA AND COMMANDS COMMUNICATION SYSTEM AND METHOD BETWEEN VARIABLE CAPACITY COMPRESSOR AND ELECTRONIC THERMOSTAT FOR A COOLING SYSTEM

(75) Inventor: Günter Johann Maass, Joinville (BR)

(73) Assignee: Whirlpool S.A., Sao Paulo (BR)

(*) Notice: Subject to any disclaimer, the term of this patent is extended or adjusted under 35 U.S.C. 154(b) by 500 days.

(21) Appl. No.: 13/503,367

(22) PCT Filed: Oct. 21, 2010

(86) PCT No.: PCT/BR2010/000348
§ 371 (c)(1),
(2), (4) Date: Jul. 10, 2012

(87) PCT Pub. No.: WO2011/047453
PCT Pub. Date: Apr. 28, 2011

(65) Prior Publication Data
US 2012/0271463 A1   Oct. 25, 2012

(30) Foreign Application Priority Data
Oct. 21, 2009 (BR) ..................................... 0904208

(51) Int. Cl.
*G06F 19/00* (2011.01)
*F25B 49/02* (2006.01)
(52) U.S. Cl.
CPC ......... *F25B 49/025* (2013.01); *F25B 2600/021* (2013.01); *Y02B 30/741* (2013.01)
USPC .............. 700/276; 700/299; 62/236; 165/202
(58) Field of Classification Search
USPC .................... 700/276, 277, 299; 62/239, 236; 165/202
See application file for complete search history.

(56) References Cited

U.S. PATENT DOCUMENTS
4,566,289 A   1/1986  Iizuka et al.
4,718,247 A   1/1988  Kobayashi et al.
(Continued)

FOREIGN PATENT DOCUMENTS
JP        61/138043      6/1986
WO    WO 98/15790      4/1998
WO    WO 2005/067135   7/2005

OTHER PUBLICATIONS
International Search Report mailed Nov. 22, 2011 for International application No. PCT/BR2010/000348.
(Continued)

*Primary Examiner* — Kidest Bahta
(74) *Attorney, Agent, or Firm* — Fay Sharpe LLP

(57) ABSTRACT

The present invention refers to a data and commands communication system between compressor and electronic thermostat, particularly applied to cooling systems having variable capacity compressor (VCC), with the purpose of providing an exchange of data between said equipment which is technically more efficient and less costly compared to the solutions available today. Accordingly, there is described a data communication system between variable capacity compressor and electronic thermostat for a cooling system, the compressor comprising at least a frequency inverter unit (100) electrically associated to an electrical motor of the compressor, the electronic thermostat (200) being electrically associated to the frequency inverter unit (100), the electronic thermostat (200) and the frequency inverter unit (100) being powered by an alternating voltage source (15), the data communication system comprising a data communication single highway (50) between the electronic thermostat (200) and the inverter unit (100), arranged to establish an exchange of data between the thermostat (200) and the inverter unit (100), the exchange of data between the thermostat (200) and the inverter unit (100) being provided by the modulation of an electrical magnitude (Snetwork) of the alternating voltage source (15), the modulation of the electrical magnitude (Snetwork) of the alternating voltage source (15) being capable of configuring a modulated information signal (Sx), the exchange of data between the thermostat (200) and the inverter unit (100) being provided by a demodulation of the modulated information signal (Sx).

19 Claims, 12 Drawing Sheets

(56) References Cited

U.S. PATENT DOCUMENTS

| | | | | |
|---|---|---|---|---|
| 5,524,444 | A | * | 6/1996 | Gromala et al. ................ 62/115 |
| 6,099,259 | A | * | 8/2000 | Monk et al. ..................... 417/15 |
| 6,134,901 | A | | 10/2000 | Harvest et al. |
| 7,716,937 | B2 | * | 5/2010 | Schenk et al. ............... 62/228.4 |
| 8,141,377 | B2 | * | 3/2012 | Connell et al. ................ 62/239 |

OTHER PUBLICATIONS

Written Opinion mailed Nov. 22, 2011 for International application No. PCT/BR2010/000348.

Reply to Written Opinion dated Feb. 16, 2012 for International application No. PCT/BR2010/000348.

International Preliminary Report on Patentability mailed Apr. 10, 2012 for International application No. PCT/BR2010/000348.

* cited by examiner

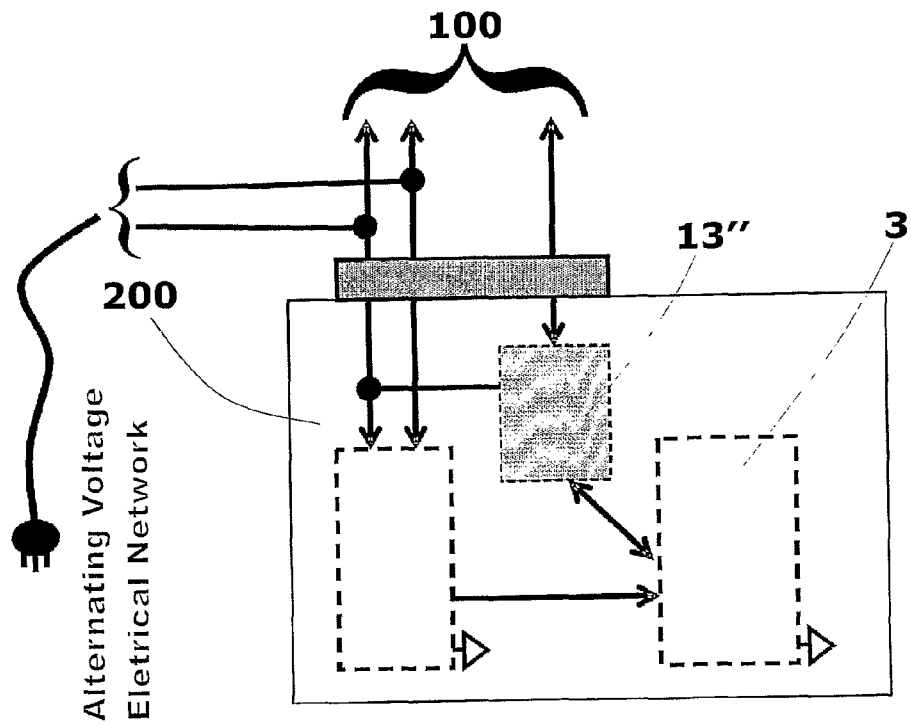
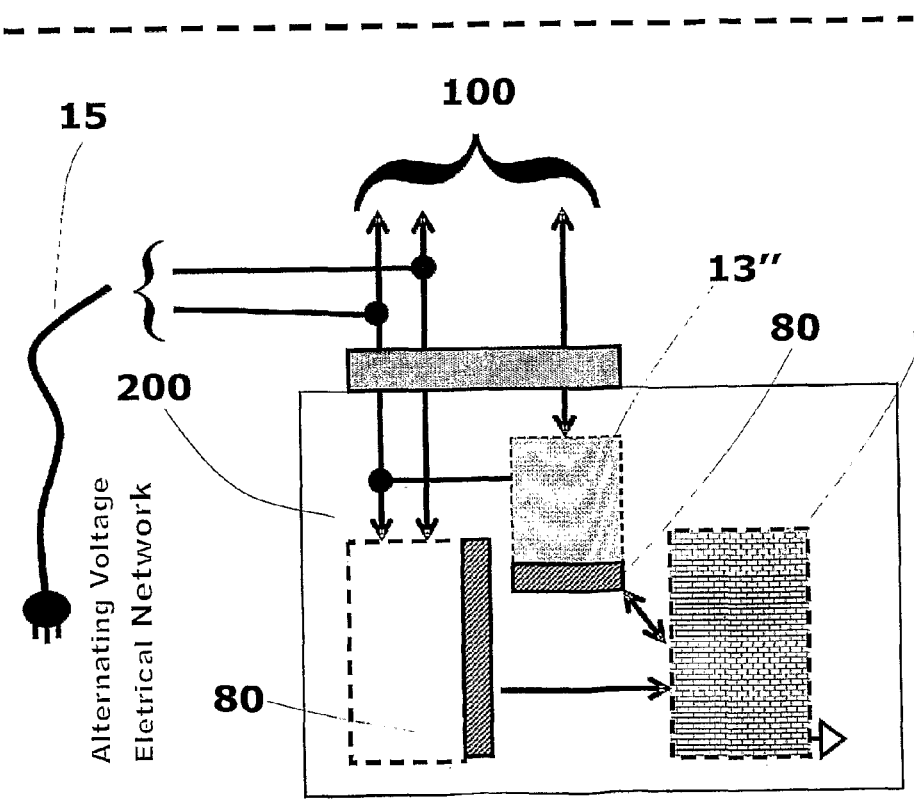

DATA AND COMMANDS COMMUNICATION SYSTEM AND METHOD BETWEEN VARIABLE CAPACITY COMPRESSOR AND ELECTRONIC THERMOSTAT FOR A COOLING SYSTEM

This application claims priority of Brazilian patent application No. PI0904208-3 the disclosure thereof being hereby incorporated by reference.

The present invention refers to a data and commands communication system between compressor and electronic thermostat, particularly applied to cooling systems having variable capacity compressor (VCC), with the aim of providing an exchange of data between said equipment which is technically more efficient and less costly compared to the solutions available today.

Additionally, the present invention refers to a data communication method between compressor and electronic thermostat designed for a cooling system, employing the system now described.

The present invention also discloses a cooler especially having a data communication system as defined in the present invention.

DESCRIPTION OF THE STATE OF THE ART

Today, in order to meet the most demanding requirements of efficiency, domestic and commercial cooling systems have the option of using variable capacity compressors, which as the very name indicates, allows the adjustment of cooling capacity by varying the pumping speed of the cooling gas (that is, of the mass flow), according to the system's need.

The variable capacity compressor (VCC) has an electronic control unit, called frequency inverter. In a large number of cases, said frequency inverter performs the information exchange with the electronic temperature control of the cooling system, also known as electronic thermostat.

The inverter may, for example, inform to the electronic thermostat, the current status of the compressor and magnitudes measured. Moreover, the electronic thermostat, for example, can send a command signal to the inverter in order to adjust the rotation of the motor inside the compressor, according to the need of the cooling system, providing more or less heat from inside the cooler to the outside environment.

The variation of the motor rotation provides the variation of the mass flow of the cooling gas in the system, thus ensuring the viability of the variable cooling capacity of the compressor.

Regarding the electronic thermostat and frequency inverter arrangement, there is a basic arrangement (first arrangement) employed to perform the exchange of information between the electronic thermostat and inverter, and two other basic arrangements (second and third arrangements) employed to send the information solely from the thermostat to the frequency inverter, in order to send a command signal, for example, to turn on the compressor or make it operate at a desired rotation.

In a denominated first arrangement, the exchange of information is made by an exclusive physical means for this purpose, and may be, for example, of the serial kind with three wires.

Of the basic arrangements where the signal relay is unidirectional (from the electronic thermostat to the frequency inverter), the denominated second arrangement, where the electronic thermostat informs to the frequency inverter what the motor rotation should be, therefore, the inverter will be operating as an element that follows a given rotation or speed reference.

In the so-called third arrangement, the electronic thermostat merely indicates to the frequency inverter the moment at which the compressor should operate and cease operating. In this latter arrangement, the inverter is the element that defines the rotation of the motor of the compressor, based on past records of the compressor's energy demands. Therefore, in the last (third) arrangement, the signal coming from the thermostat is resumed in just two levels (on or off), and can easily be performed by a slow element, which may or may not be referenced to the electrical network.

Based on the above, the present system and method offer a new communication arrangement between the electronic thermostat and frequency inverter, using the electrical network (PHASE or NEUTRAL) as reference.

By way of the arrangement proposed, it is possible to obtain bidirectional communication, such as in the first arrangement already mentioned, or merely unidirectional communication with the same functions as the second arrangement mentioned, where the electronic thermostat is the element that transmits information to the frequency inverter.

For unidirectional communication, it is possible to employ a hardware arrangement identical to that of the third arrangement, the difference being that the signal transmitted by the thermostat is not just a command to turn the compressor on or off, but a signal that represents more complex values (reference, magnitudes, commands etc.), transmitted by an electrical conductor referenced to the PHASE or to the NEUTRAL of the electrical network.

Accordingly, it becomes feasible for the manufacturer of the cooler to reduce costs, as it is possible to have a single electronic thermostat model ready to be employed in any of the three current basic arrangements, besides ensuring the viability of electric energy transmission to the electronic thermostat (PHASE and NEUTRAL of the electrical network) jointly with the communication channel, in a same cable, and therefore, making just a connection in the electronic thermostat and in the frequency inverter.

OBJECTIVES OF THE INVENTION

A first objective of the present invention is to propose a data communication system between the electronic thermostat and frequency inverter of a variable capacity compressor, by way of a hardware arrangement that makes use of the alternating voltage electrical network as reference.

A second objective of the present invention is to reduce the number of cables between the electronic thermostat and frequency inverter of the variable capacity compressor.

An additional objective of the present invention is to reduce the costs related to the assembly of the communication system now proposed, for the manufacturer of the cooling system, reducing the number of connections between said thermostat and the inverter, besides reducing stock items (from two cables to one) and other possible parts required to accommodate a second cable.

Additionally, it is another objective of the present invention to allow the use of a single cable between the electronic thermostat and inverter, with less demanding insulation characteristics compared to the command cable in cooling systems with insulated electronic thermostat.

Lastly, it is an additional objective of the present invention to propose a form of communication between the electronic thermostat and frequency inverter which allows the use of a same hardware capable of performing the communication functions existing today, such as the exchange of more complex command information (command words), or the use of simple on/off commands, whereby reducing the costs relating to the maintenance of different electronic control models available today in the state of the art.

BRIEF DESCRIPTION OF THE INVENTION

A manner of achieving the objective of the present invention is by way of a data communication system between variable capacity compressor and electronic thermostat for a cooling system, the compressor comprising at least a frequency inverter unit electrically associated to an electrical motor of the compressor, the electronic thermostat being electrically associated to the frequency inverter unit, the electronic thermostat and the frequency inverter unit being powered by an alternating voltage source, the data communication system comprising a data communication single highway between the electronic thermostat, and the inverter unit arranged to establish an exchange of data between the thermostat and inverter unit, the exchange of data between the thermostat and inverter unit being provided by the modulation of an electrical magnitude of the alternating voltage source, the modulation of the electrical magnitude of the alternating voltage source being capable of configuring a modulated information signal, the exchange of data between the thermostat and inverter unit being provided by a demodulation of the modulated information signal.

A second manner of achieving the objectives of the present invention is by providing a data communication system between variable capacity compressor and electronic thermostat for a cooling system, the compressor comprising at least a frequency inverter unit electrically associated to an electrical motor of the compressor, the electronic thermostat being electrically associated to the frequency inverter unit, the electronic thermostat and the frequency inverter unit being powered by an alternating voltage source, the data communication system comprising a data communication single highway, arranged to establish an exchange of data between the thermostat and inverter unit, the single highway being connected by way of a first electrical connection point to the electronic thermostat, and by way of a second electrical connection point to the inverter unit, the inverter unit having at least an inverter communication branch electrically associated to the first electrical connection point at a first end, and at an end opposite the first one, to a first terminal of alternating voltage source, the electronic thermostat having at least a thermostat communication branch electrically associated to the second electrical connection point at a first end, and at an end opposite the first one, at a second terminal of the alternating voltage source, an electrical communication circuit being defined by an electrical association between the alternating voltage source, the inverter communication branch, a data communication single highway and the thermostat communication branch, the exchange of data between the thermostat and inverter unit being provided by the modulation of an electrical magnitude of the alternating voltage source, so as to arrange a modulated information signal, the exchange of data between the thermostat and inverter unit being provided by a demodulation of the modulated information signal.

A third manner of achieving the objectives of the present invention is by providing a data communication method between variable capacity compressor and electronic thermostat for a cooling system, the compressor comprising at least a frequency inverter unit electrically associated to an electrical motor of the compressor, the electronic thermostat being electrically associated to a frequency inverter unit, the electronic thermostat and the frequency inverter unit being powered by an alternating voltage source, the method comprising the following steps:

inform to the frequency inverter unit, by means of the electronic thermostat, a thermal setpoint condition of the cooling system, or any other information or command relevant to the frequency inverter, in a first communication instant, by sending a first command signal from a data communication single highway, and inform to the electronic thermostat, by means of the inverter unit, at least a measured magnitude value or operating condition of the compressor, in a second communication instant, by sending a second command signal using a data communication single highway.

Lastly, the objectives of the present invention are achieved by providing a cooler having a data communication system between the electronic thermostat and frequency inverter of a compressor, such as proposed in the object now claimed.

BRIEF DESCRIPTION OF THE DRAWINGS

The present invention will now be described in greater detail, with reference to the accompanying drawings, wherein:

FIGS. 6a and 6b—illustrate the two arrangements of the electronic thermostat concerning the electrical insulation between the logical circuit of the thermostat and the transmission circuit and receipt of information, referenced to the electrical network;

DETAILED DESCRIPTION OF THE DRAWINGS

FIGS. 1 to 4 show embodiments of a data communication system normally employed in the state of the art.

Figure 1:
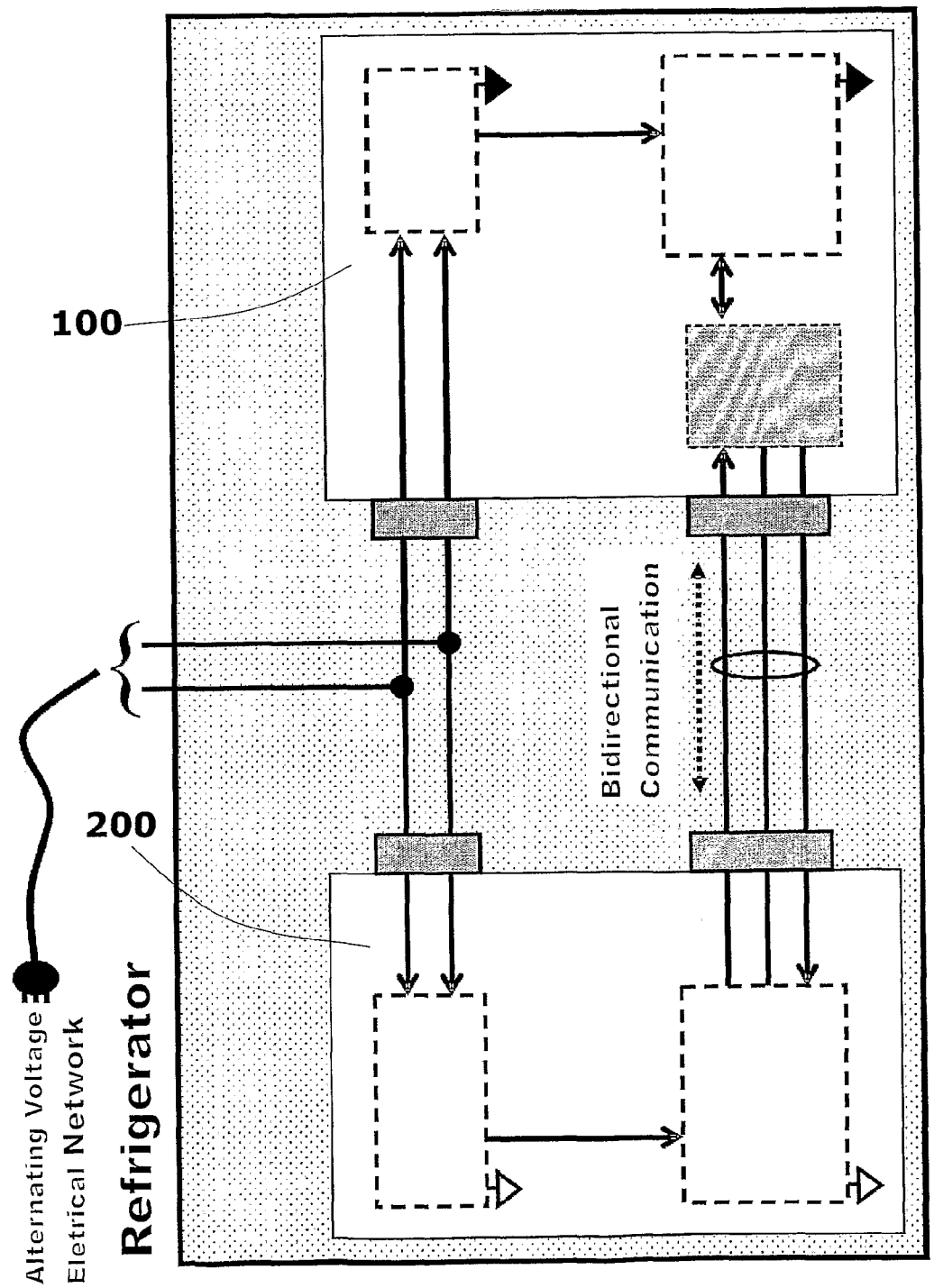
FIG. 1—represents a first communication arrangement normally used in the state of the art, between an electronic thermostat and a frequency inverter for cooling systems, where there is bidirectional communication between the controls, by way of an exclusive physical means.
Figure 2:
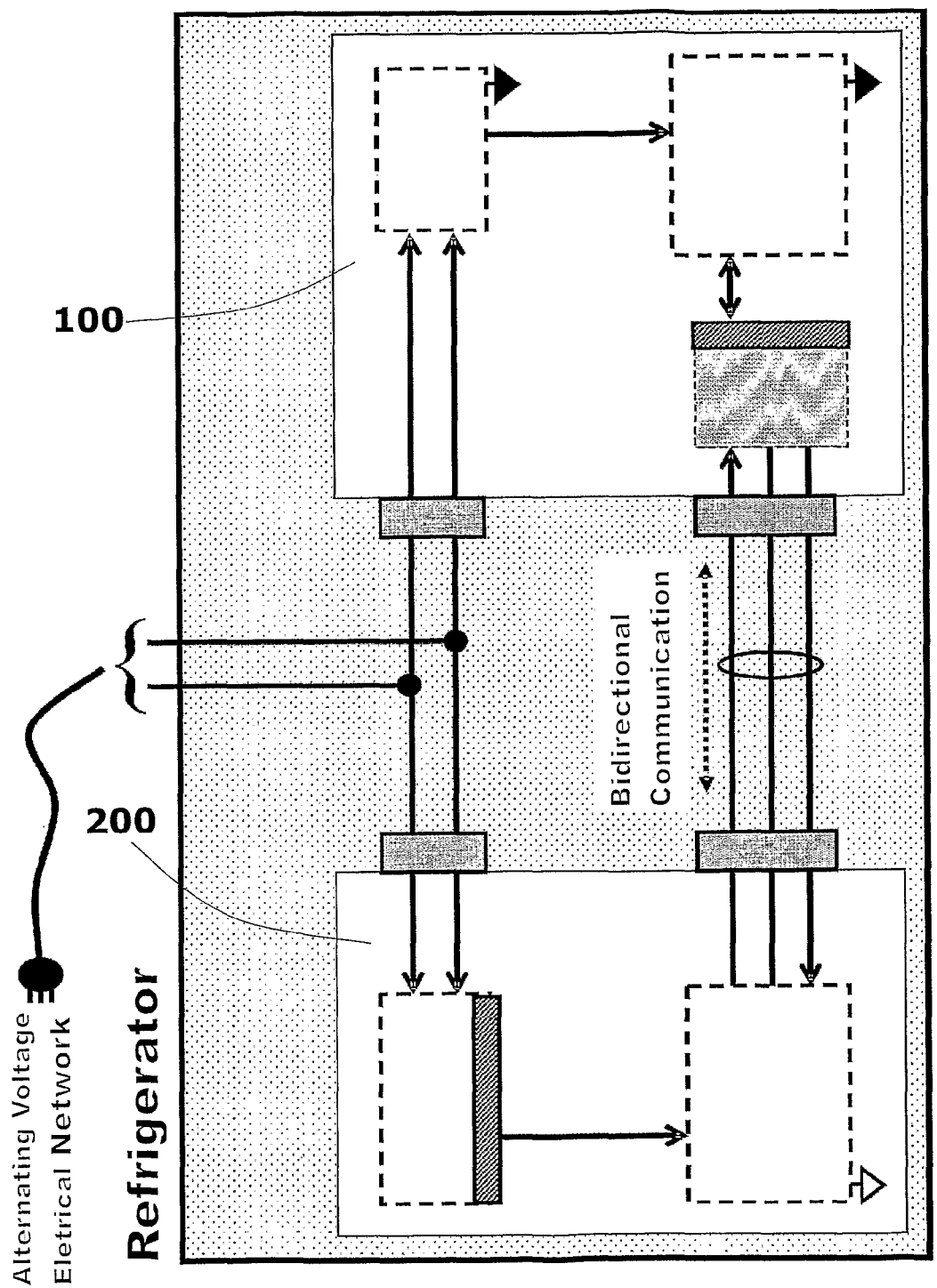
FIG. 2—illustrates a first arrangement between the thermostat and inverter equipment in the state of the art, illustrating the case in which the control circuit of the electronic thermostat is electrically insulated from the electrical network.
Figure 3:
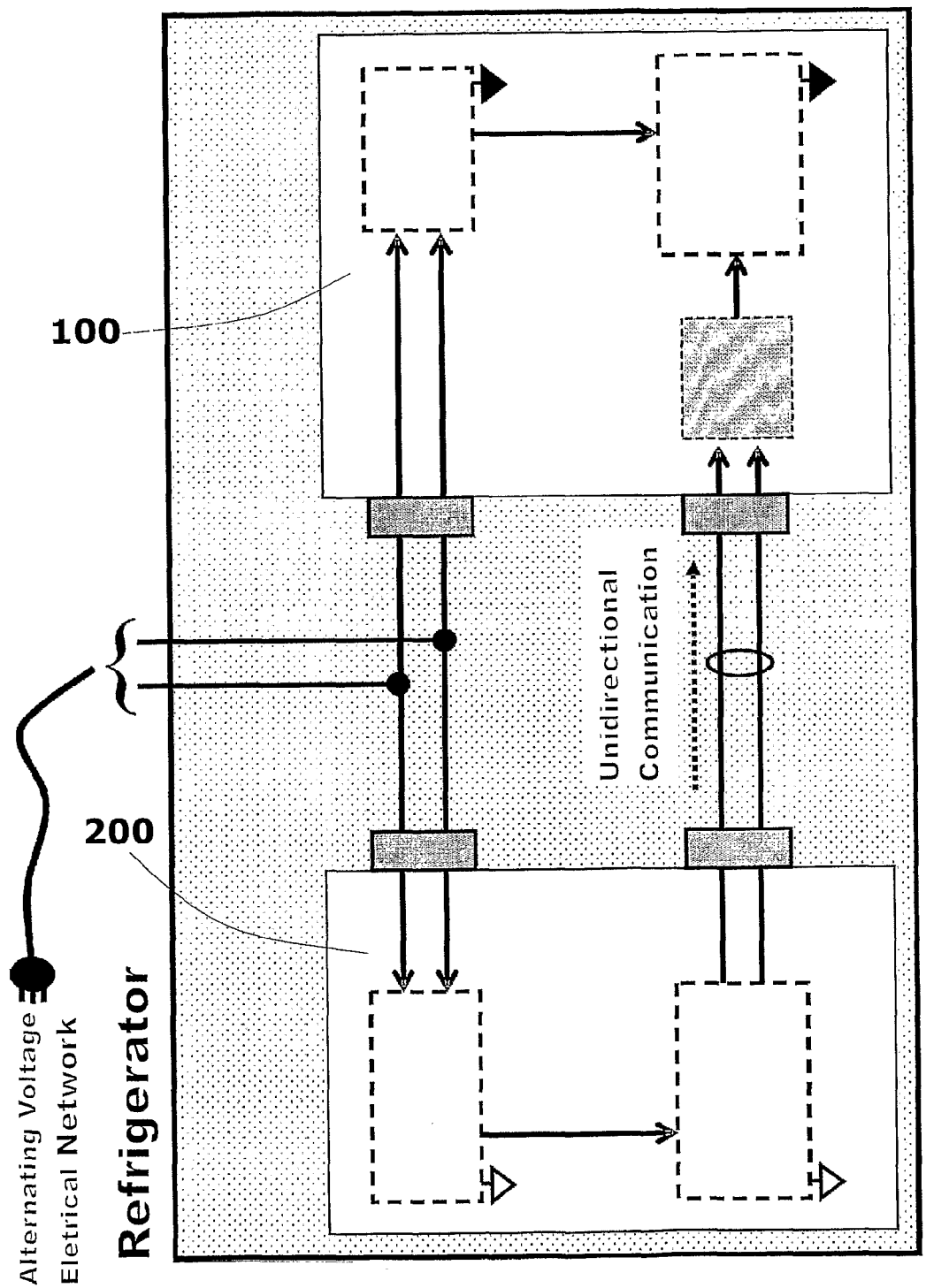
FIG. 3—illustrates a second communication arrangement normally used between the electronic thermostat and frequency inverter, for cooling systems, where the thermostat sends information to the frequency inverter by way of an exclusive physical means.

More particularly, FIG. 1 shows a first communication arrangement between an electronic thermostat and an inverter unit, or frequency inverter, for cooling systems, where there is bidirectional communication between the controls, by way of a physical means formed by three communication cables.

Figure 5:
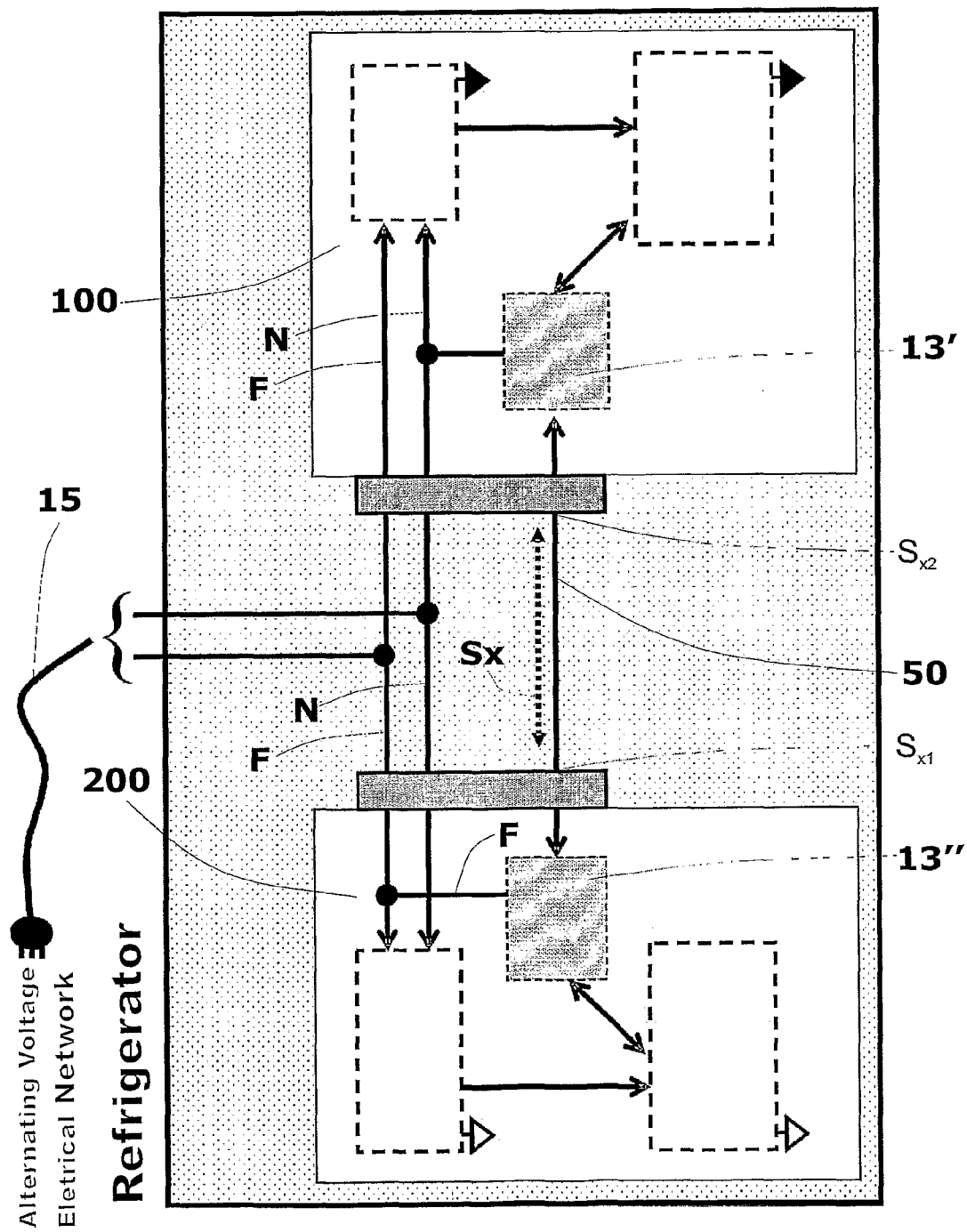
FIG. 5—shows a communication arrangement, object of the present invention, between an electronic thermostat and a frequency inverter for cooling systems.

FIG. 5 illustrates an arrangement proposed for the present invention, in order to develop data communication between the electronic thermostat 200 and an inverter unit 100.

The data communication system between variable capacity compressor and electronic thermostat for a cooling system, such as proposed in the present invention, comprises at least a frequency inverter unit 100 electrically associated to an electrical motor of the compressor.

FIG. 5 also shows that the electronic thermostat 200 is electrically associated to the frequency inverter unit 100, the electronic thermostat 200 and the frequency inverter unit 100 being powered by an alternating voltage source 15.

Advantageously in comparison with prior arts, the present system has a data communication single highway 50 between the electronic thermostat 200 and the frequency inverter unit 100 arranged to establish an exchange of data between said devices. In the present case, said data communication highway 50 is formed by a single data communication electrical cable, differently from the solutions available today in an efficient exchange of data between thermostat 200 and inverter unit 100. FIG. 5 also illustrates that in the present system, a single connection, comprised of a single cable, comprises both the communication highway, and the alternating voltage power capable of powering the thermostat 200 and the inverter unit 100.

Figure 4:
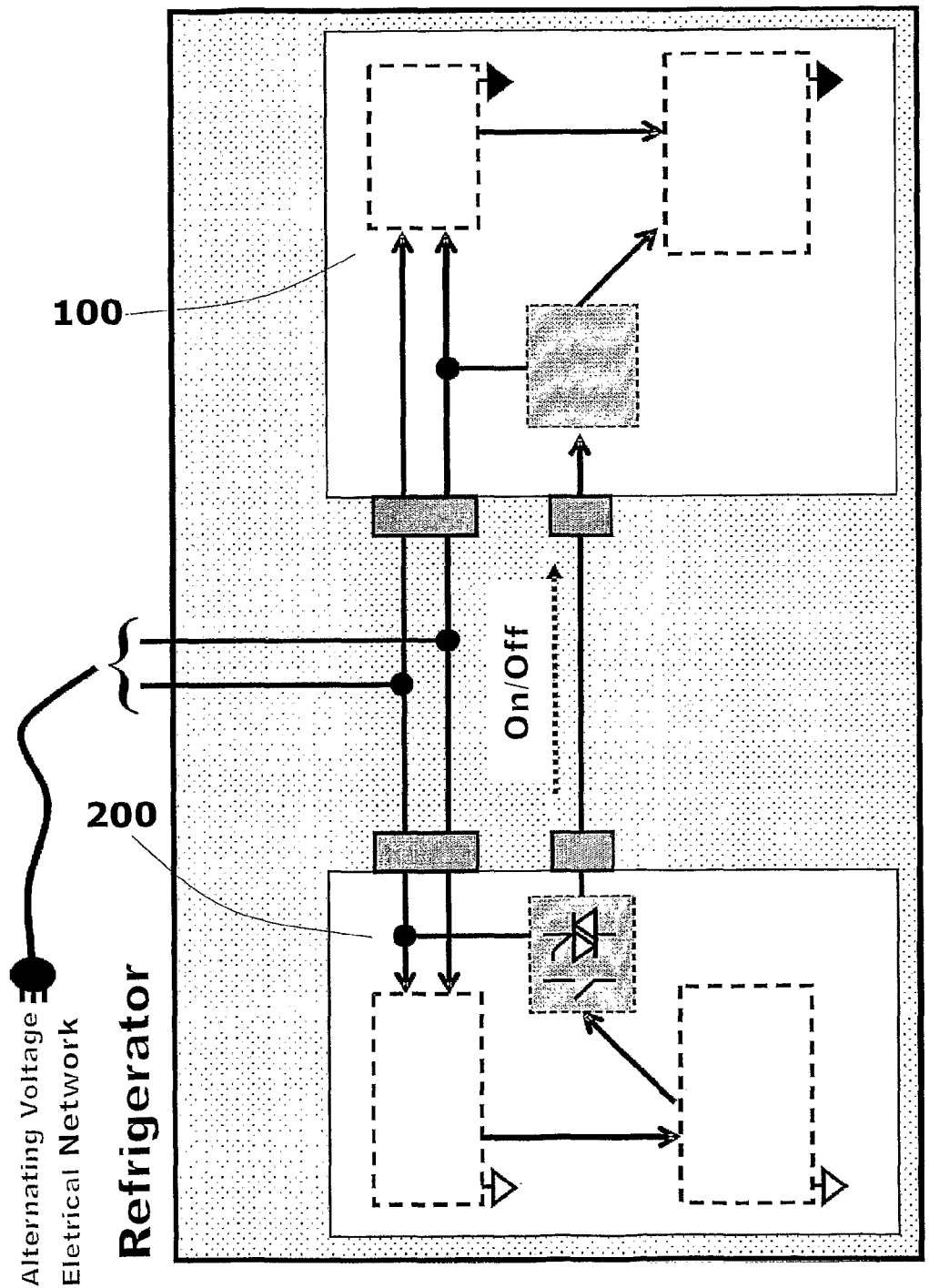
FIG. 4—illustrates a third communication arrangement normally used between the electronic thermostat and frequency inverter, for cooling systems, where the thermostat informs the moment to turn the compressor on or off, by way of a circuit referenced to the electrical power network, the frequency inverter being the element that defines the rotation of the motor of the compressor.

An additional innovative characteristic of the present invention refers to the modulation of an electrical magnitude Snetwork of the alternating voltage source 15, so as to modify the alternating voltage of the electrical network, thus allowing more efficient and complete data communication between the electronic thermostat 200 and the inverter unit 100, when compared, for example, to the solution presented in FIG. 4. This solution offers just one command of the on/off type between said electronic devices, and not a data command communication and equipment status, such as proposed in the present invention.

In essence, the exchange of data between the thermostat 200 and the inverter unit 100, pursuant to the teachings of the present invention, is provided by the modulation of an electrical magnitude Snetwork of the alternating voltage source 15, said magnitude preferably being a voltage value Vf or current If obtained from the alternating voltage source 15.

Said modulation of the electrical magnitude Snetwork is capable of configuring a modulated information signal Sx. Thus, the exchange of data between the electronic thermostat 200 and the inverter unit 100 is provided by a demodulation of the modulated information signal Sx.

FIG. 5 shows that the modulated information signal Sx offers an exchange of data in both unidirectional and bidirectional modes between the thermostat 200 and the inverter unit 100.

More specially, bidirectional data communication can be exemplified based on two communication periods or moments, described below:

1. The exchange of data begins by a first communication period T1, arranged for the modulation of the electrical magnitude Snetwork of the alternating voltage source 15 by the electronic thermostat 200 and for the demodulation of the modulated information signal Sx by the inverter unit 100, and 2. By a second communication period T2 arranged for the modulation of the electrical magnitude Snetwork of the alternating voltage source 15 by the inverter unit 100 and for the demodulation of the modulated information signal Sx from the electronic thermostat 200.

For the first communication period T1, the electronic thermostat 200 informs, for example, to the inverter unit 100, what the rotation of the electrical motor should be, or informs to said inverter unit 100 the best moment for turning the compressor on or off.

For the second communication period T2, the frequency inverter unit 100 may inform, as mentioned previously, to the electronic thermostat 200 the current status of the compressor and of the measured electrical magnitudes.

Unidirectional data communication occurs by modulation of the electrical magnitude Snetwork of the alternating voltage source 15 generated by the electronic thermostat 200, and by demodulation of the electrical magnitude Snetwork of the alternating voltage source 15 determined by the inverter unit 100.

In order to exploit the present invention in greater detail, FIG. 5 also shows other relevant characteristics which make up the data communication system now proposed. Note, for example, the existence of first and second data communication blocks 13',13" disposed respectively in the frequency inverter unit 100 and in the electronic thermostat 200.

Whereas the first data communication block 13' is electrically associated to a second terminal of the alternating voltage source 15, preferably the neutral terminal N of the source 15, the second data communication block 13" is electrically associated to a first terminal of the alternating voltage source 15, preferably the phase terminal F of the source 15, so as to establish an electrical communication circuit referenced to the electrical network, and the exchange of data between the thermostat 200 and the inverter unit 100.

This form of communication, that is, referenced to the electrical power network, is achieved by the use of electrical insulation means both for the electronic thermostat 200, and for the frequency inverter unit 100.

FIGS. 6a and 6b illustrate two possible situations designed merely for the insulation of the electronic thermostat 200. More especially, FIG. 6a shows the use of electrical insulation 80 applied to an electronic circuit 3, disposed in said thermostat 200, said circuit being responsible for generating and interpreting the shared information, or just sent to the frequency inverter unit 100.

Electrical insulation 80 can be formed by different types of electrical and/or electronic devices, such as optocouplers, transformers, among others. FIG. 6b shows, however, an arrangement in which it is not necessary to use an electrical insulation 80.

Figure 7B:
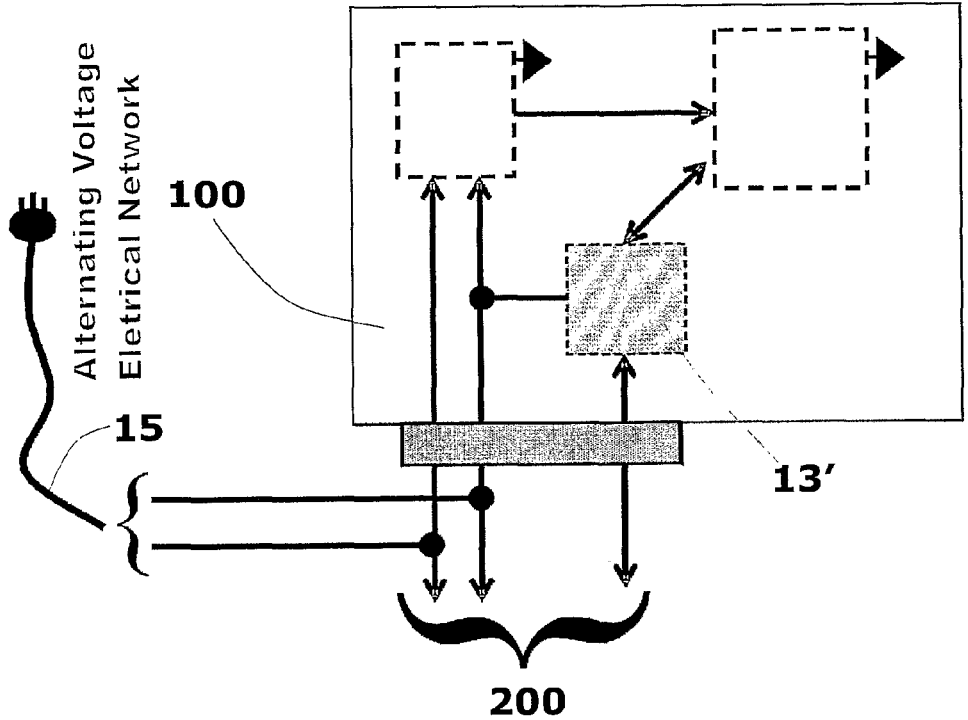
FIGS. 7a and 7b—show the two arrangements of the frequency inverter circuit responsible for receiving and transmitting information from the electronic thermostat, especially related to the electrical insulation for purposes of safety or immunity to disturbances from the electrical network.
Figure 7A:
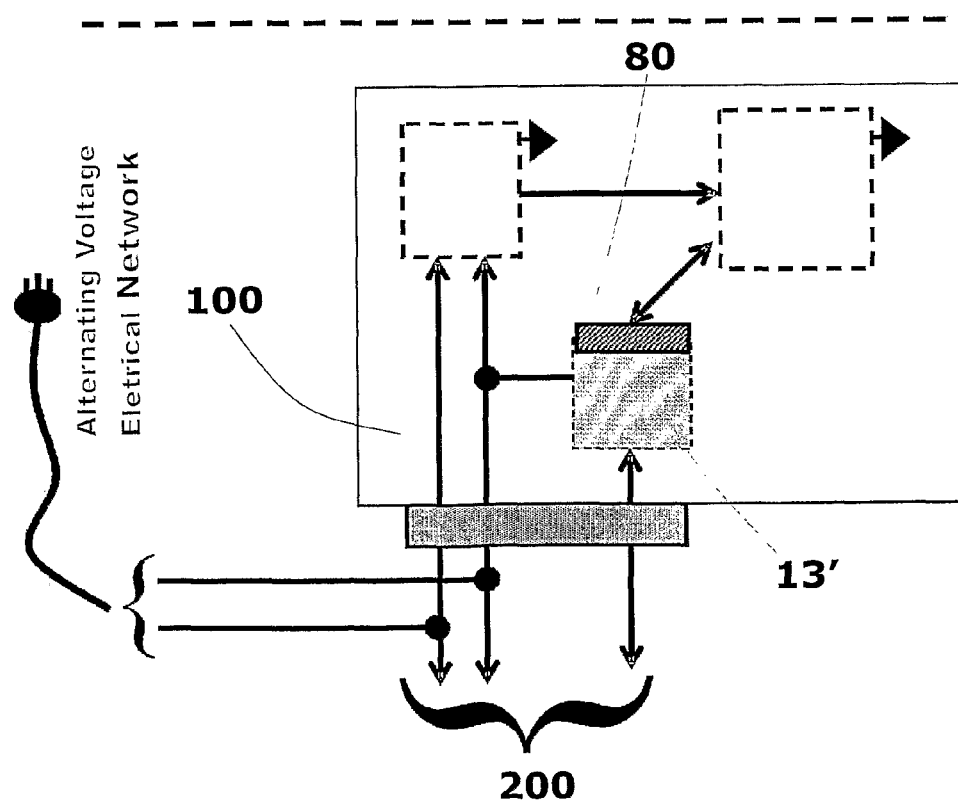

In turn, FIGS. 7a and 7b show possible arrangements for the electrical insulation next to the frequency inverter unit 100. FIG. 7a illustrates the application of an electrical insulation 80 for the electronic circuit of said unit 100, whereas FIG. 7b shows an item of equipment devoid of such insulation.

Normally, the electronic circuit of the inverter unit 100 is not insulated from the alternating voltage electrical network, however, it is usual to employ an insulating element in the position indicated by FIG. 7a, in order to avoid the reading/transmission input, or just the data reading from being damaged in the event of a disturbance of the electrical network, such as a voltage surge, electromagnetic noise, etc.

In any case, as already presented in FIG. 7b, said insulation can be omitted, depending on the input/output characteristics of the signal receptor circuit of the inverter unit 100.

Figure 8:
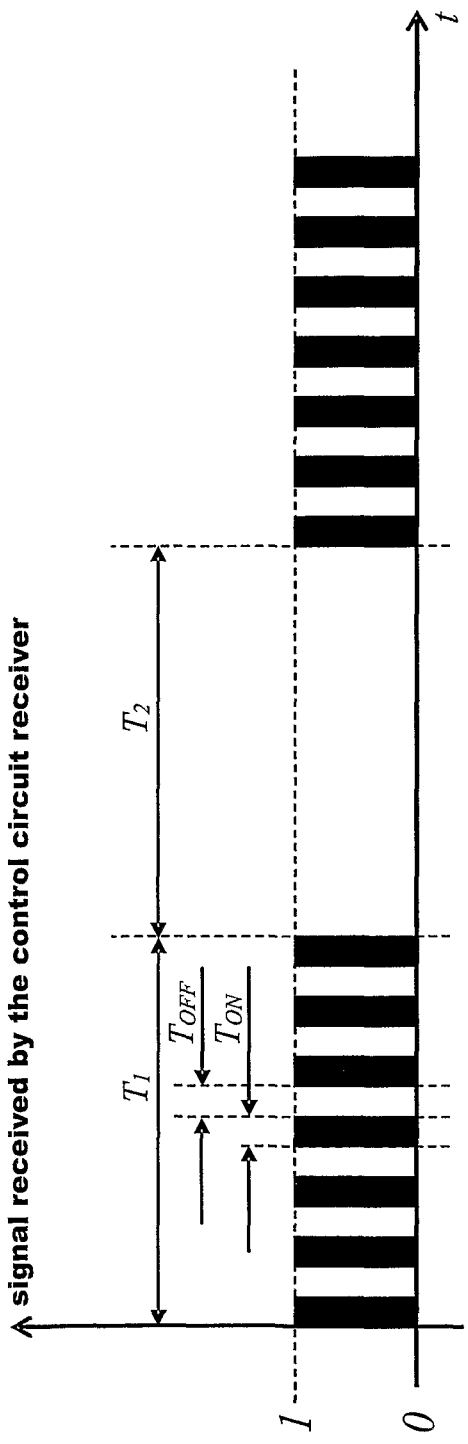
FIG. 8—illustrates, or exemplifies, a first form of modulating the alternating voltage in order to transmit information; in this case, by counting cycles of the alternating voltage network.
Figure 9:
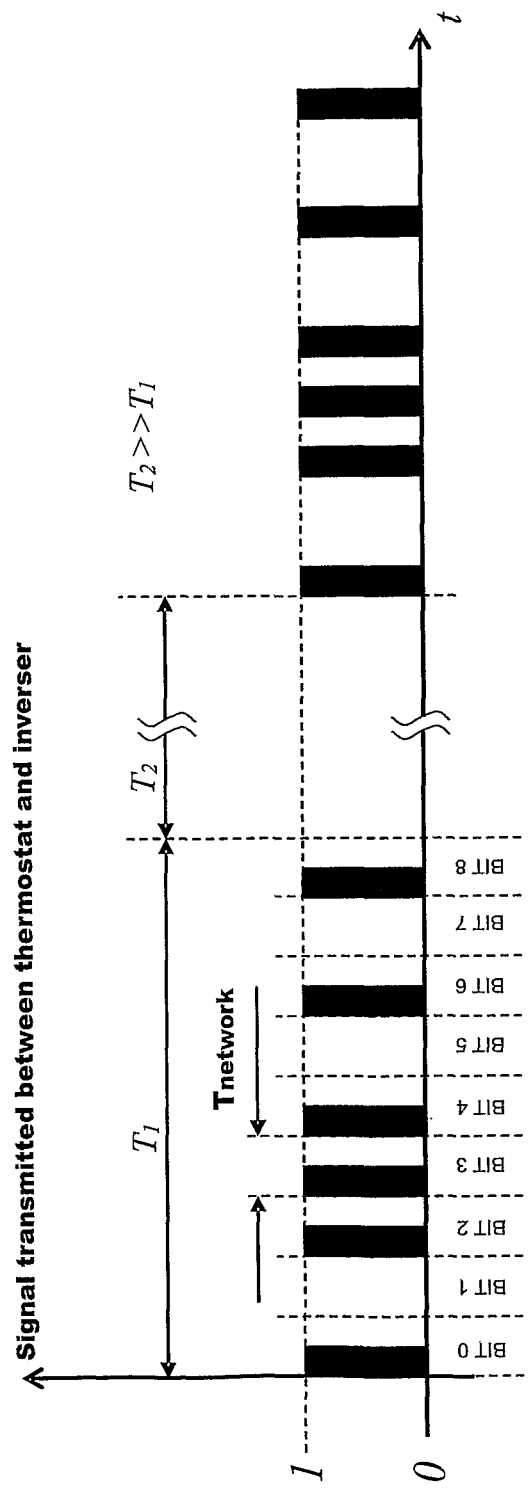
FIG. 9—illustrates a second form of modulating the alternating voltage in order to transmit information; in this case, by way of a binary word formed by cycles of the alternating voltage network.
Figure 10:
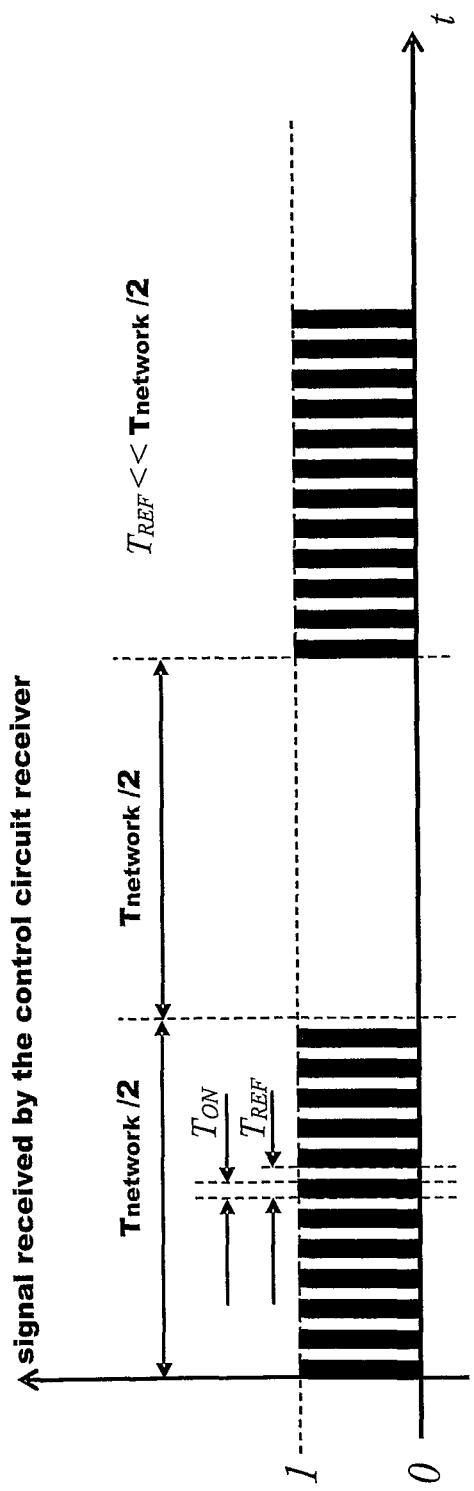
FIG. 10—shows a third form of modulating the alternating voltage of the electrical network, in order to transmit information; in this case, by way of a frequency signal obtained by the modulation of the alternating voltage at a greater frequency than that of the electrical network.

FIGS. 8 to 10 show, pursuant to the teachings of the present invention, possible forms of modulation of the electrical magnitude Snetwork, so as to establish an exchange of data between the electronic thermostat 200 and the inverter unit 100.

FIG. 8 demonstrates that the signal transmitted by the data communication single highway 50, referenced to the electrical network, or to the alternating voltage source 15, can be formed basically by pulses related to frequency of the network.

In this case, the number of pulses is interpreted, both by the thermostat 200, and by the inverter unit 100, as a command or datum. The thermostat 200, for example, may send the frequency inverter unit 100 a rotation value to be followed by the compressor, proportional to the number of pulses. Therefore, the modulated information signal Sx is formed, in this case, by counting a number of frequency cycles of the alternating voltage source 15.

As an example of implementation, let us consider a rotation range of 3300 RPM, with minimum resolution of 50 RPM, counting 66 pulses of the network for maximum rotation and 1 pulse for minimum rotation. Along the lines of this reasoning, a rotation of 1000 RPM above the minimum rotation is identified by counting 20 pulses.

Another possible form of modulation is illustrated in FIG. 9. In this case, the system operates in the sense of modulating the voltage of the alternating voltage source 15, or the voltage value Vf obtained from the alternating voltage source 15, so as to create binary information formed by "n" bits. In this solution, for a word having 8 bits, or 1 byte, the first bit (BIT 0) indicates the start of the word to be interpreted by the control circuit that receives the information. In FIG. 9, each bit is represented by a voltage cycle of the alternating voltage source 15.

However, there may be variations of the modulation proposed above, such that each bit is formed by more than 1 cycle, whereby increasing the robustness of the signal transmitted. Thus, for the modulation mechanism presented in FIG. 9, the modulated information signal Sx is formed by a set of binary words formed by frequency cycles of the alternating voltage source 15.

FIG. 10 illustrates another example of a signal format capable of providing data communication between thermostat 200 and inverter unit 100, pursuant to the object of the invention now proposed.

In this case, the second data communication block 13", as shown in FIG. 5, is a semiconductor device capable of modulating the voltage of the electrical network at a greater frequency. For instance, in a network of 50 Hz, it is possible to use a frequency range of some kHz during a semicycle of the network voltage.

In other words, the frequency inverter unit 100 could read the value of this frequency and correlate it to a rotation to be applied in the compressor. What is more, it is possible to vary the time TON as a form of transmitting a value, or else perform a modulation identical to the one illustrated on FIG. 9, in order to form binary information.

Therefore, the modulation presented in FIG. 10 shows that the modulated information signal Sx is carried out using a measured frequency value, or cyclic rate, of the alternating voltage source 15.

Figure 11:
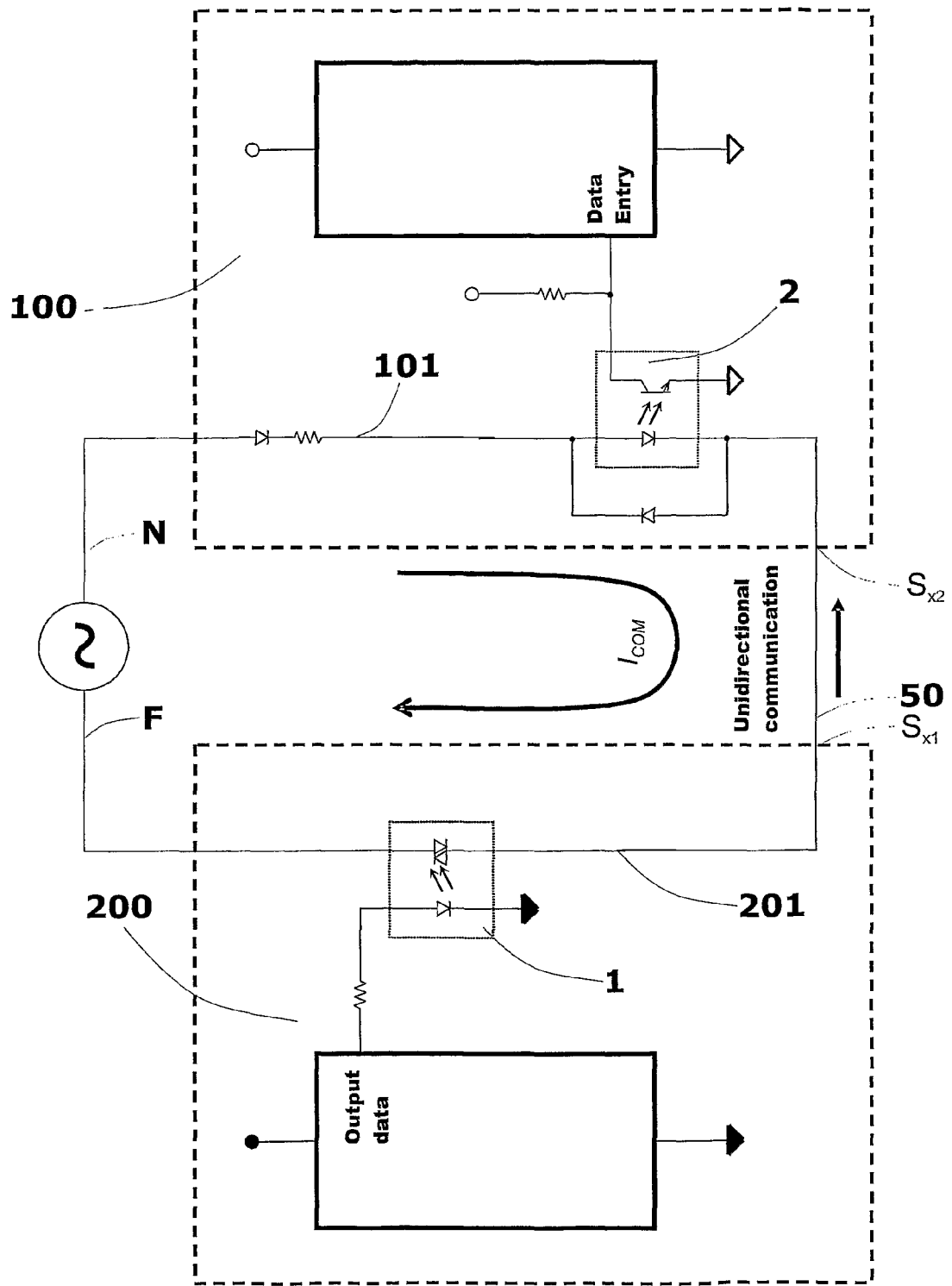
FIG. 11—illustrates the implementation of the arrangement now proposed, to obtain the same effect as the denominated second arrangement (electronic thermostat sends information to the frequency inverter) employing the electrical network as reference.
Figure 12:
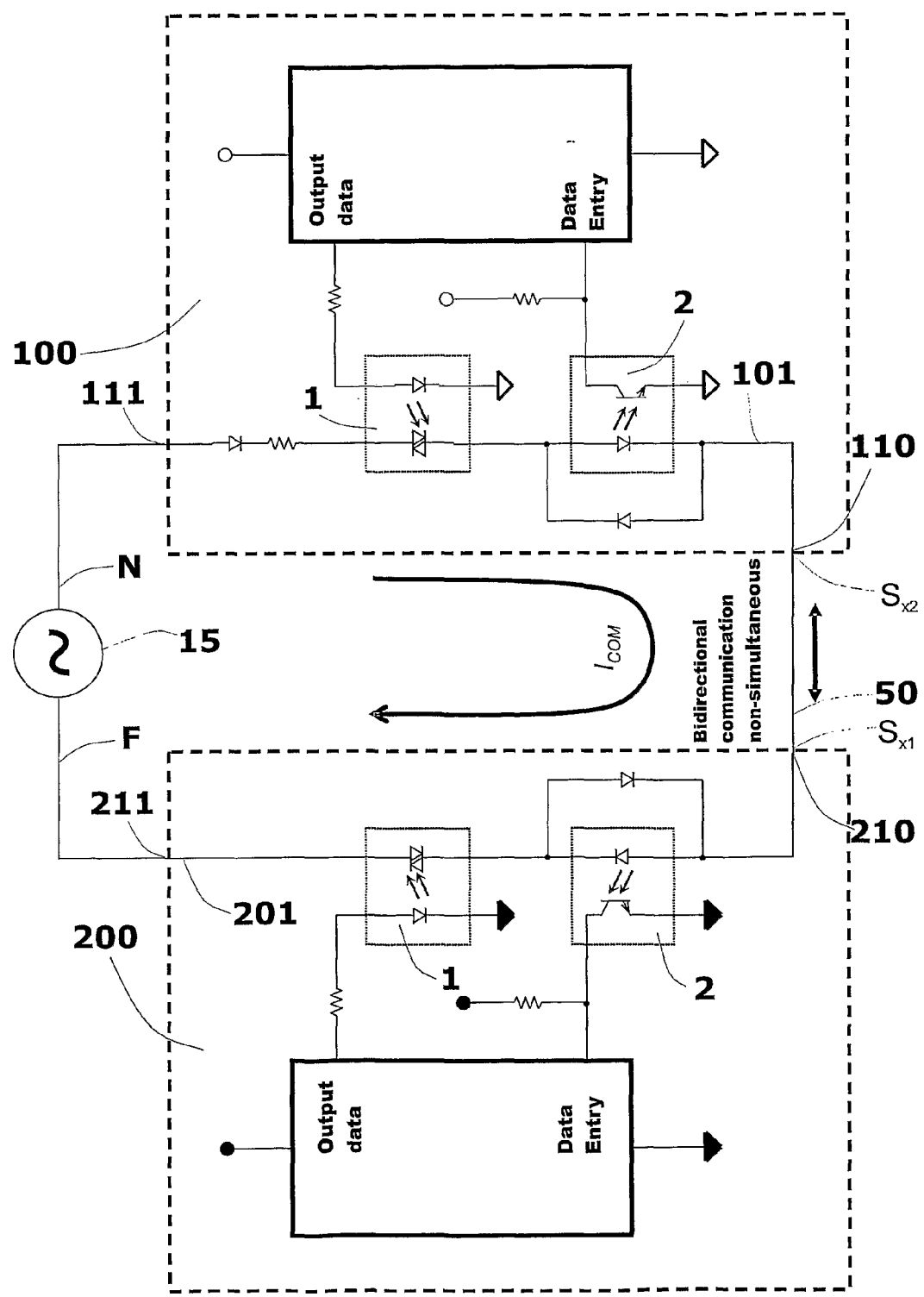
FIG. 12—illustrates the implementation of the proposed arrangement to obtain the same effect as the denominated first arrangement (electronic thermostat and frequency inverter exchange information) employing the electrical network as reference.

FIGS. 11 and 12 exemplify two possible embodiments for the data communication system proposed in the present invention, designed respectively for unidirectional and bidirectional communication. It is possible to note, for example, that the data communication single highway 50 is connected, by way of a first electrical connection point Sx1, to the electronic thermostat 200, and by way of a second electrical connection point Sx2, an inverter unit 100.

It is also possible to note that the denominated first and second data communication blocks 13',13" each have at least a data communication branch or device.

More particularly, the inverter unit 100 has at least an inverter communication branch 101, this being electrically associated to a second electrical connection point Sx2 in a first pole inverter 110, and in a second pole inverter 111, opposite the first pole inverter 110, to a second terminal of the alternating voltage source 15. Said terminal is preferably a neutral terminal N.

In contrast, the electronic thermostat 200 has at least a thermostat communication branch 201 electrically associated to a first electrical connection point Sx1 in a first thermostat pole 210, and in a second thermostat pole 211, opposite the first thermostat pole 210, to a first terminal of the alternating voltage source 15. Said first terminal is preferably a phase terminal F. In any case the first terminal of the alternating voltage source 15 can be formed by the neutral terminal N, whereas the second terminal from the same source is comprised of its phase terminal F.

It can be affirmed that an electrical communication circuit is defined by an electrical association between the alternating voltage source 15, the inverter communication branch 101, the communication data single highway 50 and the thermostat communication branch 201.

In said arrangements, as commented upon previously, the exchange of data between the thermostat 200 and the inverter unit 100 is provided by the modulation of an electrical magnitude Snetwork of the alternating voltage source 15, so as to arrange a modulated information signal Sx. Said communication also occurs by demodulation of the modulated information signal Sx.

FIG. 11 shows, for unidirectional data communication, that the inverter communication branch 101 comprises at least an electronic receptor device 2 and the thermostat communication branch 201 at least an electronic transmitter device 1.

FIG. 12, in turn, illustrates in greater detail that the inverter communication branch 101 and the thermostat communication branches 201 each one comprises at least an electronic transmitter device 1 and at least an electronic receptor device 2 in bidirectional communication.

In the present invention the modulation of the electrical magnitude Snetwork is preferably carried out by way of the electronic transmitter device 1 and the demodulation of the modulated information signal Sx is performed by way of the receptor device 2.

Further preferably, the electronic transmitter device 1 is an electronic component, or electronic circuit, insulated or not, capable of modulating the electrical magnitude Snetwork according to the signals established by the data output of the respective control circuits, and the electronic receptor device 2 is an electronic component, or electronic circuit, insulated or not, capable of adjusting the modulated magnitude Snetwork, for correct interpretation of the data by the respective control circuits. Said devices are commanded by the respective electronic control circuits.

It has to be said that bidirectional data communication, pursuant to the teachings of the present invention, is not performed simultaneously, that is, when the electronic thermostat 200 sends information to the frequency inverter unit 100, the electronic transmitter device present in the thermostat is modulated, at the same time in which the receptor device 2, disposed in the inverter unit 100, receives the modulated information for subsequent demodulation of the modulated information signal Sx, whereby allowing the use of a data communication single highway 50.

The solutions presented in FIGS. 11 and 12 take into account, preferably, the electrical insulation of the alternating voltage source 15, for safety reasons, and to prevent contamination of the system by potential noise interference from the network. However, other hardware solutions may be used without said insulation, as shown in FIGS. 6a, 6b, 7a and 7b.

With the solutions described above, the objectives of the present invention are achieved, making use of an electronic thermostat 200 and an inverter unit 100, electrically associated together, by a single highway, or cable, of data communication 50, said devices being referenced to the alternating voltage source 15 and capable of modulating the voltage of the electric power network in order to establish a simple and efficient exchange of data for the system now proposed, compared to the techniques known today and applied to cooling equipment.

Additionally, the present invention makes use of a data communication system between the electronic thermostat 200 and the frequency inverter unit 100 at low frequency, differently to the PLC-type communication solutions, which allows this present solution to achieve its objectives with less costly hardware.

It is also important to point out that the present invention provides a single electrical connection with the power network, or alternating voltage source 15, and with the data communication highway, both by the electronic thermostat 200, and by the frequency inverter unit 100.

The present invention also provides a data communication method between variable capacity compressor and electronic thermostat for a cooling system, said compressor having at least a frequency inverter unit 100 electrically associated to an electrical motor.

The electronic thermostat 200 is electrically associated to the frequency inverter unit 100, said devices being powered by an alternating voltage source 15. The method now proposed comprises the following steps:

inform to the frequency inverter unit 100, by means of the electronic thermostat 200, a thermal setpoint condition of the cooling system 20, or any other information or command relevant to the frequency inverter, in a first communication instant t10, by sending a modulated information signal Sx from a data communication single highway 50, inform to the electronic thermostat 200, by means of the inverter unit 100, at least a measured magnitude value or operating condition of the compressor, in a second communication instant t20, by sending a modulated information signal Sx, using a data communication single highway 50.

Lastly, the present invention provides a cooler having at least a data communication system between variable capacity compressor and electronic thermostat as defined in the object now proposed.

Having described an example of a preferred embodiment, it should be understood that the scope of the present invention encompasses other possible variations, and is limited only by the content of the accompanying claims, potential equivalents being included therein.

The invention claimed is:

1. Data and commands communication system between a variable capacity compressor and an electronic thermostat (200) for a cooling system, the compressor comprising at least a frequency inverter unit (100) electrically associated to an electrical motor of the compressor, the electronic thermostat (200) being electrically associated to the frequency inverter unit (100), the electronic thermostat (200) and the frequency inverter unit (100) being powered by an alternating voltage source (15);
   the frequency inverter unit (100) comprising an electronic receptor device (2); and
   the electronic thermostat (200) comprising an electronic transmitter device (1);
   the data communication system comprising:
   a data communication single highway (50) formed by a single data communication electrical cable between the electronic thermostat (200) and the inverter unit (100);
   an electrical communication circuit defined by an electrical association between the alternating voltage source (15), the communication data single highway (50), the frequency inverter unit (100) and the electronic thermostat (200);
   the electronic transmitter device (1) being capable of modulating a voltage value (Vf) or a current value (If) of the alternating voltage source (15) and the electronic receptor device (2) being capable of demodulating the voltage value (Vf) or the current value (If) of the alternating voltage source (15) in order to establish an exchange of data between the frequency inverter unit (100) and the electronic thermostat (200) via the data communication single highway (50).

2. Data and commands communication system between a variable capacity compressor and an electronic thermostat for a cooling system, according to claim 1, wherein the exchange of data between the electronic thermostat (200) and the inverter unit (100) is unidirectional.

3. Data and commands communication system between a variable capacity compressor and an electronic thermostat for a cooling system, according to claim 1, wherein:
   the inverter comprises additionally at least an electronic transmitter device (1);
   the thermostat comprises additionally at least an electronic receptor device (2);
   the exchange of data between the electronic thermostat (200) and the inverter unit (100) is bidirectional.

4. Data and commands communication system between a variable capacity compressor and an electronic thermostat for a cooling system, according to claim 3, wherein the bidirectional exchange of data occurs:
   by way of a first communication period (T1), arranged for the modulation of the voltage value (Vf) or the current value (If) of the alternating voltage source (15) configuring a modulated information signal (Sx) by the electronic thermostat (200) and for the demodulation of the modulated information signal (Sx) by the inverter unit (100), and by way of a second communication period (T2) arranged for the modulation of the voltage value (Vf) or the current value (If) of the alternating voltage source (15) configuring a modulated information signal (Sx) by the inverter unit (100) and for the demodulation of the modulated information signal (Sx) by the electronic thermostat (200).

5. Data and commands communication system between a variable capacity compressor and an electronic thermostat for a cooling system, according to claim 2, wherein the unidirectional data communication occurs by the modulation of the voltage value (Vf) or the current value (If) of the alternating voltage source (15) generated by the electronic thermostat (200) and by the demodulation of the voltage value (Vf) or the current value (If) of the alternating voltage source (15) determined by the inverter unit (100).

6. Data and commands communication system between a variable capacity compressor and an electronic thermostat for a cooling system, according to claim 4, wherein the modulated information signal (Sx) is formed by counting a number of frequency cycles of the alternating voltage source (15).

7. Data and commands communication system between a variable capacity compressor and an electronic thermostat for a cooling system, according to claim 4, wherein the modulated information signal (Sx) is formed from a set of binary words formed by frequency cycles of the alternating voltage source (15).

8. Data and commands communication system between a variable capacity compressor and an electronic thermostat for a cooling system, according to claim 1, wherein the modulated information signal (Sx) is carried out using a measured frequency value, or cyclic rate, of the alternating voltage source (15).

9. Data and commands communication system between a variable capacity compressor and an electronic thermostat for a cooling system, according to claim 1, wherein the communication data single highway (50) comprises an alternating voltage power coming from the alternating voltage source (15) capable of powering the electronic thermostat (200) and the inverter unit (100).

10. Data and commands communication system between a variable capacity compressor and an electronic thermostat for a cooling system, the compressor comprising at least a frequency inverter unit (100) electrically associated to an electrical motor of the compressor, the electronic thermostat (200) being electrically associated to the frequency inverter unit (100), the electronic thermostat (200) and the frequency inverter unit (100) being powered by an alternating voltage source (15), the data communication system comprising:

a data communication single highway (50) formed by a single data communication electrical cable between the electronic thermostat (200) and the inverter unit (100), arranged to establish an exchange of data between the thermostat (200) and the inverter unit (100), the single highway (50) being connected, by way of a first electrical connection point (Sx1), to the electronic thermostat (200), and by way of a second electrical connection point (Sx2), to the inverter unit (100), an inverter unit (100) having at least an inverter communication branch (101) electrically associated to the second electrical connection point (Sx2) in a first pole inverter (110), and in a second pole inverter (111), opposite the first pole inverter (110), to a second terminal of the alternating voltage source (15), the electronic thermostat (200) having at least a thermostat communication branch (201) electrically associated to the first electrical connection point (Sx1) in a first thermostat pole (210), and in a second thermostat pole (211), opposite the first thermostat pole (210), to a first terminal of the alternating voltage source (15), the exchange of data between the thermostat (200) and the inverter unit (100) being provided by the modulation of an voltage value (Vf) or a current value (If) of the alternating voltage source (15), so as to arrange a modulated information signal (Sx), the exchange of data between the thermostat (200) and the inverter unit (100) being provided by a demodulation of the modulated information signal (Sx).

11. Data and commands communication system between a variable capacity compressor and an electronic thermostat for a cooling system, according to claim 10, wherein the first terminal of the alternating voltage source (15) is a phase terminal (F) and the second terminal of the alternating voltage source (15) is a neutral terminal (N), or vice versa.

12. Data and commands communication system between a variable capacity compressor and an electronic thermostat for a cooling system, according to claim 10, wherein the inverter communication branch (101) comprises at least an electronic receptor device (2) and the thermostat communication branch (201) at least an electronic transmitter device (1) in unidirectional communication.

13. Data and commands communication system between a variable capacity compressor and an electronic thermostat for a cooling system, according to claim 10, wherein the inverter communication branch (101) and thermostat communication branches (201) each one comprises at least an electronic transmitter device (1) and at least an electronic receptor device (2) in bidirectional communication.

14. Data and commands communication system between a variable capacity compressor and an electronic thermostat for a cooling system, according to claim 12, wherein the modulation of the voltage value (Vf) or the current value (If) is performed by way of the electronic transmitter device (1) and the demodulation of the modulated information signal (Sx) is performed by way of the receptor device (2).

15. Data and commands communication system between a variable capacity compressor and an electronic thermostat for a cooling system, according to claim 13, wherein the modulation of the voltage value (Vf) or the current value (If) is performed by way of the electronic transmitter device (1) and the demodulation of the modulated information signal (Sx) is performed by way of the receptor device (2).

16. Data and commands communication system between a variable capacity compressor and an electronic thermostat for a cooling system, according to claim 10, wherein the electronic transmitter device (1) is a component or electronic circuit, insulated or not, capable of modulating the voltage value (Vf) or the current value (If), and the electronic receptor device (2) is a component, or electronic circuit, insulated or not, capable of demodulating the voltage value (Vf) or current value (If), for correct interpretation of the data by the respective control circuits.

17. Data and command communication method between a variable capacity compressor and an electronic thermostat for a cooling system, the compressor comprising at least a frequency inverter unit (100) electrically associated to an electrical motor of the compressor, the electronic thermostat (200) being electrically associated to the frequency inverter unit (100), the electronic thermostat (200) and the frequency inverter unit (100) being powered by an alternating voltage source (15), the method comprising:

informing to the frequency inverter unit (100), by means of the electronic thermostat (200), a thermal setpoint condition of the cooling system, in a first communication instant (t10), by sending a modulated information signal (Sx) from a data communication single highway (50) formed by a single data communication electrical cable between the electronic thermostat (200) and the inverter unit (100), informing to the electronic thermostat (200), by means of the inverter unit (100), at least a measured electrical magnitude value, in a second communication instant (t20), by sending a modulated information signal Sx using the data communication single highway (50).

18. A cooler comprising at least a data communication system between a variable capacity compressor and an electronic thermostat as defined in claim 1.

19. A cooler comprising at least a data communication system between a variable capacity compressor and an electronic thermostat as defined in claim 10.

* * * * *